United States Patent
Zeng et al.

(10) Patent No.: US 10,340,994 B2
(45) Date of Patent: Jul. 2, 2019

(54) METHOD FOR BEAM TRAINING IN MULTIUSER SCENARIO AND APPARATUS

(71) Applicant: Huawei Technologies Co., Ltd., Shenzhen (CN)

(72) Inventors: Kun Zeng, Chengdu (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/883,526

(22) Filed: Jan. 30, 2018

(65) Prior Publication Data

US 2018/0159608 A1    Jun. 7, 2018

Related U.S. Application Data

(63) Continuation of application No. PCT/CN2015/085739, filed on Jul. 31, 2015.

(51) Int. Cl.
  *H04B 7/06* (2006.01)
  *H04B 7/08* (2006.01)
  (Continued)

(52) U.S. Cl.
  CPC ......... *H04B 7/0617* (2013.01); *H04B 7/0408* (2013.01); *H04B 7/063* (2013.01);
  (Continued)

(58) Field of Classification Search
  CPC .... H04B 7/0695; H04B 7/088; H04B 7/0617; H04B 7/0417; H04B 7/0608
  See application file for complete search history.

(56) References Cited

U.S. PATENT DOCUMENTS

2011/0064033 A1   3/2011   Gong et al.
2011/0080898 A1   4/2011   Cordeiro et al.
(Continued)

FOREIGN PATENT DOCUMENTS

CN   104079334 A   10/2014
CN   104734754 A   6/2015

OTHER PUBLICATIONS

IEEE P802.11ay™/D1.0, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz, Prepared by the 802.11 Working Group of the LAN/MAN Standards Commette of the IEEE Computer Society, Nov. 2017, 490 pages.
(Continued)

*Primary Examiner* — Ross Varndell
(74) *Attorney, Agent, or Firm* — Slater Matsil, LLP

(57) ABSTRACT

Embodiments disclose a method for beam training in a multiuser scenario and an apparatus. The method is applied to beam training performed on multiple responders by an initiator and includes: sending, by the initiator, status information of transmit antennas of the initiator to a first responder of the multiple responders, so that the first responder selects a to-be-used transmit antenna from the transmit antennas according to the status information, where the status information is used to indicate whether the transmit antennas of the initiator are selected; and receiving, by the initiator, feedback information sent by the first responder, and determining, according to the feedback information, the to-be-used transmit antenna selected by the first responder.

20 Claims, 7 Drawing Sheets

(51) Int. Cl.
*H04W 16/28* (2009.01)
*H04B 7/0408* (2017.01)

(52) U.S. Cl.
CPC ......... *H04B 7/0643* (2013.01); *H04B 7/0695* (2013.01); *H04B 7/088* (2013.01); *H04W 16/28* (2013.01)

(56) References Cited

U.S. PATENT DOCUMENTS

| | | | |
|---|---|---|---|
| 2013/0059619 A1 | 3/2013 | Kim et al. | |
| 2013/0315325 A1 | 11/2013 | Wang et al. | |
| 2015/0244432 A1* | 8/2015 | Wang | H04B 7/0695 375/267 |
| 2015/0289147 A1* | 10/2015 | Lou | H04B 7/0408 370/329 |
| 2016/0285583 A1* | 9/2016 | Kasher | H04L 1/0001 |

OTHER PUBLICATIONS

Nitsche, T. et al., "IEEE 802.11ad: Directional 60 GHz Communication for Multi-Gigabit-per-Second Wi-Fi," IEEE Communications Magazine, Dec. 2014, pp. 132-141.

* cited by examiner

METHOD FOR BEAM TRAINING IN MULTIUSER SCENARIO AND APPARATUS

CROSS-REFERENCE TO RELATED APPLICATIONS

This application is a continuation of International Application No. PCT/CN2015/085739, filed on Jul. 31, 2015, the disclosure of which is hereby incorporated by reference in its entirety.

TECHNICAL FIELD

The present invention relates to the field of communications technologies, and in particular, to a method for beam training in a multiuser scenario and an apparatus.

BACKGROUND

It is estimated that, in a future decade, mobile broadband traffic will be more than one thousand times larger than the mobile broadband traffic of today. Bandwidth of a relatively low conventional frequency band cannot meet service requirements brought by this explosive growth. Therefore, using a millimeter-wave band (30 GHz to 300 GHz) with abundant bandwidth resources as a backhaul frequency and an access frequency will become a development trend in the industry.

Compared with communication at a relatively low frequency band, millimeter-wave communication is more easily affected by factors such as rain fade and atmospheric absorption, resulting in a large path loss. To ensure a specific propagation distance, a beamforming technology needs to be used for the millimeter-wave band, to obtain good link transmission quality.

Beamforming derives from a concept of an adaptive antenna and can be classified into beamforming at a transmit end and beamforming at a receive end. Beamforming at the transmit end means that amplitude and/or phase adjustment is performed on a feed of an antenna array element, to form a specific transmit signal. From a perspective of an antenna pattern, a beam in a specified direction is formed. Beamforming at the receive end means that a weighted synthesis is performed on various signals received by a plurality of antenna array elements, to form a directivity pattern of a required spatial shape. It should be noted that a prerequisite for using the beamforming technology is that a plurality of antennas should be deployed on at least one of a transmitter or a receiver on a communications link. FIG. 1 shows an example of beamforming at a transmit end, where a group of antennas (an antenna array) usually forms a directional beam.

However, a beam formed after beamforming is used for the millimeter-wave band is usually narrow. Therefore, in an access scenario, to ensure a specific coverage area, a typical solution is to use a beam training technology.

A basic principle of the beam training technology is to adjust, according to information such as a user location and a channel state, directions of directional beams generated by antennas of a transmit end and a receive end on a communications link, so that the beams of the transmit end and/or the receive end are spatially "aligned", to obtain a relatively high antenna gain. A beam of a base station points to a user terminal as much as possible by means of beam training, as shown in FIG. 2a. If beam training is also used at the user terminal, beams of the base station and the user terminal are "aligned" as much as possible, as shown in FIG. 2b.

The beam training technology has been commercially available in the IEEE 802.11ad standard, which is a commercial wireless local area network standard for a 60 GHz frequency band. A beam training method defined in the IEEE 802.11ad standard supports only a single input single output (SISO) transmission mode. That is, both a transmit end and a receive end use only a single beam to send and receive signals.

Obviously, the beam training method in the IEEE 802.11ad does not support a multiple input multiple output (MIMO) mode. To support the multiple input multiple output mode, a beam training solution in a MIMO mode is proposed in a current system based on the solution provided in the IEEE 802.11ad. In the MIMO mode, it is required only to select N groups of "aligned" directional beams according to a quantity of streams transmitted in parallel using MIMO, and generate antenna pairs corresponding to the N groups of directional beams. In addition, a single antenna (which is an array antenna) can generate only one beam direction in a single time segment. Therefore, specific implementation may be as follows.

When determining N transmit antenna beam directions and receive antenna beam directions that are finally selected, a station (STA) needs to select N transmit antenna beam directions from N different transmit antennas, that is, to form N antenna pairs that generate directional beams.

It can be learned from the beam training implementation solution in the MIMO mode that N directional beam pairs selected by a responder of beam training need to be generated by different transmit/receive antenna pairs. If the technical solution is used in a scenario of multiple responders (for example, STAs), a conflict may occur when the multiple responders select the transmit antennas of an initiator to generate a directional beam antenna.

SUMMARY

Embodiments provide a method for beam training in a multiuser scenario and an apparatus. The method and the apparatus provided in the embodiments of the present invention resolve an existing problem that in a scenario in which beam training is performed on multiple responders, a conflict may occur when the multiple responders select transmit antennas of an initiator to generate a directional beam antenna.

According to a first aspect, a method for beam training in a multiuser scenario is provided. The method is applied to beam training performed on multiple responders by an initiator. The method includes sending, by the initiator, status information of transmit antennas of the initiator to a first responder of the multiple responders, so that the first responder selects a to-be-used transmit antenna from the transmit antennas according to the status information, where the status information is used to indicate whether the transmit antennas of the initiator are selected. The method also includes receiving, by the initiator, feedback information sent by the first responder, and determining, according to the feedback information, the to-be-used transmit antenna selected by the first responder.

With reference to the first aspect, in a first possible implementation, the status information includes: first status information indicating whether each of the transmit antennas of the initiator can be selected by the first responder; or second status information of a transmit antenna that is in the transmit antennas of the initiator and that can be selected by the first responder.

With reference to the first aspect or the first possible implementation of the first aspect, in a second possible implementation, the feedback information is ID information of the to-be-used transmit antenna. After the receiving, by the initiator, feedback information sent by the first responder, the method further includes updating, by the initiator, the status information by using the ID information of the to-be-used transmit antenna.

With reference to the first aspect or the first possible implementation of the first aspect, in a third possible implementation, the feedback information is updated status information, and the updated status information includes information indicating that the to-be-used transmit antenna is selected by the first responder.

With reference to any one of the first aspect, or the first to the third possible implementations of the first aspect, in a fourth possible implementation, the sending, by the initiator, status information of transmit antennas of the initiator to a first responder of the multiple responders includes: when the first responder performs access in a carrier sense multiple access CSMA mode, sending, by the initiator, the status information to the first responder by using a sector sweep SSW frame; or, sending the status information to the first responder by using a trigger frame, where the trigger frame is an indication frame that triggers access of a second responder, and the second responder is any responder of the multiple responders except the first responder.

With reference to any one of the first aspect, or the first to the fourth possible implementations of the first aspect, in a fifth possible implementation, the receiving, by the initiator, feedback information sent by the first responder includes receiving, by the initiator by using the SSW frame, the feedback information sent by the first responder.

With reference to any one of the first aspect, or the first to the fifth possible implementations of the first aspect, in a sixth possible implementation, when the first responder includes multiple groups of antennas and the feedback information includes information about a to-be-used antenna that is of the first responder and that corresponds to the to-be-used transmit antenna, after the receiving, by the initiator, feedback information sent by the first responder, the method further includes: forming, by the initiator according to the feedback information, a beamforming antenna pair in which the to-be-used transmit antenna corresponds to the to-be-used antenna of the first responder in a one-to-one manner.

According to a second aspect, a method for beam training in a multiuser scenario is provided. The method is applied to beam training performed on multiple responders by an initiator. The method includes: receiving, by a first responder of the multiple responders, status information sent by the initiator, where the status information is used to indicate whether transmit antennas of the initiator are selected. The method also includes selecting, by the first responder, a to-be-used transmit antenna from the transmit antennas according to the status information. The method also includes generating feedback information according to information about the to-be-used transmit antenna, and sending the feedback information to the initiator, so that after receiving the feedback information, the initiator determines, according to the feedback information, the to-be-used transmit antenna selected by the first responder.

With reference to the second aspect, in a first possible implementation, the status information includes: first status information indicating whether each of the transmit antennas of the initiator can be selected by the first responder; or second status information of a transmit antenna that is in the transmit antennas of the initiator and that can be selected by the first responder.

With reference to the second aspect or the first possible implementation of the second aspect, in a second possible implementation, the generating feedback information according to information about the to-be-used transmit antenna includes: generating the feedback information according to ID information of the to-be-used transmit antenna.

With reference to the second aspect or the first possible implementation of the second aspect, in a third possible implementation, the generating feedback information according to information about the to-be-used transmit antenna includes: updating the status information using the information about the to-be-used transmit antenna, where updated status information is the feedback information, and the feedback information includes information used to indicate that the to-be-used transmit antenna is selected by the first responder.

With reference to any one of the second aspect, or the first to the third possible implementations of the second aspect, in a fourth possible implementation, the receiving, by a first responder of the multiple responders, status information sent by the initiator includes: when the first responder performs access in a carrier sense multiple access (CSMA) mode, receiving, by the first responder, the status information from the initiator by using a sector sweep SSW frame; or, receiving the status information using a trigger frame, where the trigger frame is an indication frame that triggers access of a second responder, and the second responder is any responder of the multiple responders except the first responder.

With reference to any one of the second aspect, or the first to the fourth possible implementations of the second aspect, in a fifth possible implementation, the sending the feedback information to the initiator includes sending, by the first responder, the feedback information to the initiator using the SSW frame.

With reference to any one of the second aspect, or the first to the fifth possible implementations of the second aspect, in a sixth possible implementation, when the first responder includes multiple groups of antennas and the feedback information includes information about a to-be-used antenna that is of the first responder and that corresponds to the to-be-used transmit antenna, after the sending the feedback information to the initiator, the method further includes: forming, according to the feedback information, a beamforming antenna pair in which the to-be-used transmit antenna corresponds to the to-be-used antenna of the first responder in a one-to-one manner.

According to a third aspect, an initiator device is provided. The initiator device performs beam training on multiple responders. The initiator device includes a transceiver. The transceiver is configured to: send status information of transmit antennas of the initiator device to a first responder of the multiple responders, and receive feedback information sent by the first responder, so that the first responder selects a to-be-used transmit antenna from the transmit antennas according to the status information. The status information is used to indicate whether the transmit antennas of the initiator device are selected. The initiator device also includes a processor, configured to determine, according to the feedback information, the to-be-used transmit antenna selected by the first responder.

With reference to the third aspect, in a first possible implementation, the transceiver is configured to send, to the first responder of the multiple responders, first status information indicating whether each of the transmit antennas of the initiator device can be selected by the first responder, or second status information of a transmit antenna that is in the transmit antennas of the initiator device and that can be selected by the first responder, where the first status information or the second status information is used as the status information.

With reference to the third aspect or the first possible implementation of the third aspect, in a second possible implementation, the feedback information is ID information of the to-be-used transmit antenna, and after the feedback information sent by the first responder is received, the processor is further configured to update the status information using the ID information of the to-be-used transmit antenna.

With reference to the third aspect or the first possible implementation of the third aspect, in a third possible implementation, the feedback information received by the transceiver is updated status information, and the updated status information includes information indicating that the to-be-used transmit antenna is selected by the first responder.

With reference to any one of the third aspect, or the first to the third possible implementations of the third aspect, in a fourth possible implementation, the transceiver is configured to: when the first responder performs access in a carrier sense multiple access CSMA mode, send the status information to the first responder using a sector sweep (SSW) frame; or, send the status information to the first responder using a trigger frame. The trigger frame is an indication frame that triggers access of a second responder, and the second responder is any responder of the multiple responders except the first responder.

With reference to any one of the third aspect, or the first to the fourth possible implementations of the third aspect, in a fifth possible implementation, the transceiver is specifically configured to receive, by using the SSW frame, the feedback information sent by the first responder.

With reference to any one of the third aspect, or the first to the fifth possible implementations of the third aspect, in a sixth possible implementation, when the first responder includes multiple groups of antennas and the feedback information includes information about a to-be-used antenna that is of the first responder and that corresponds to the to-be-used transmit antenna, after the feedback information sent by the first responder is received, the processor is further configured to form, according to the feedback information, a beamforming antenna pair in which the to-be-used transmit antenna corresponds to the to-be-used antenna of the first responder in a one-to-one manner.

According to a fourth aspect, a responder device is provided, where an initiator device performs beam training on multiple responders. The responder device includes: a receiver, configured to receive status information sent by the initiator device. The status information indicates whether transmit antennas of the initiator device are selected. The responder device also includes a processor, configured to select a to-be-used transmit antenna from the transmit antennas according to the status information, and generate feedback information according to information about the to-be-used transmit antenna selected by the processor. The responder device also includes a transmitter, configured to send the feedback information to the initiator device, so that after receiving the feedback information, the initiator device determines, according to the feedback information, the to-be-used transmit antenna selected by the responder device.

With reference to the fourth aspect, in a first possible implementation, the status information received by the receiver is first status information indicating whether each of the transmit antennas of the initiator device can be selected by the responder device, or second status information of a transmit antenna that is in the transmit antennas of the initiator device and that can be selected by the responder device.

With reference to the fourth aspect or the first possible implementation of the fourth aspect, in a second possible implementation, the processor is configured to generate the feedback information according to ID information of the to-be-used transmit antenna.

With reference to the fourth aspect or the first possible implementation of the fourth aspect, in a third possible implementation, the processor is configured to update the status information using the information about the to-be-used transmit antenna, where updated status information is the feedback information, and the feedback information includes information indicating that the to-be-used transmit antenna is selected by the responder device.

With reference to any one of the fourth aspect, or the first to the third possible implementations of the fourth aspect, in a fourth possible implementation, the receiver is configured to: when the responder device performs access in a carrier sense multiple access (CSMA) mode, receive the status information from the initiator device using a sector sweep (SSW) frame; or, receive the status information by using a trigger frame. The trigger frame is an indication frame that triggers access of a second responder, and the second responder is any responder of the multiple responders except the current responder device.

With reference to any one of the fourth aspect, or the first to the fourth possible implementations of the third aspect, in a fifth possible implementation, the transmitter is configured to send the feedback information to the initiator device using the SSW frame.

With reference to any one of the fourth aspect, or the first to the fifth possible implementations of the fourth aspect, in a sixth possible implementation, when the responder device includes multiple groups of antennas and the feedback information includes information about a to-be-used antenna that is of the responder device and that corresponds to the to-be-used transmit antenna, the processor is further configured to form, according to the feedback information, a beamforming antenna pair in which the to-be-used transmit antenna corresponds to the to-be-used antenna of the responder device in a one-to-one manner.

According to a fifth aspect, an initiator device is provided. The initiator device performs beam training on multiple responders. The initiator device includes a sending module, configured to send status information of transmit antennas of the initiator device to a first responder of the multiple responders, so that the first responder selects a to-be-used transmit antenna from the transmit antennas according to the status information. The status information indicates whether the transmit antennas of the initiator device are selected. The initiator device also includes a receiving module, configured to receive feedback information sent by the first responder. The initiator device also includes a determining module, configured to determine, according to the feedback information, the to-be-used transmit antenna selected by the first responder.

With reference to the fifth aspect or any possible implementation of the fifth aspect, in a further implementation of the fifth aspect, when the first responder includes multiple groups of antennas and the feedback information includes information about a to-be-used antenna that is of the first responder and that corresponds to the to-be-used transmit antenna, the initiator device further includes: an antenna pair forming module, configured to form, according to the feedback information, a beamforming antenna pair in which the to-be-used transmit antenna corresponds to the to-be-used antenna of the first responder in a one-to-one manner.

With reference to the fifth aspect or any possible implementation of the fifth aspect, in a further implementation of the fifth aspect, the initiator device further includes: a status information generation module. The status information generation module is configured to: generate the status information using a status indicating whether each of the transmit antennas of the initiator device can be selected by the first responder; or generate the status information using a status of a transmit antenna that is in the transmit antennas of the initiator and that can be selected by the first responder.

With reference to the fifth aspect or any possible implementation of the fifth aspect, in a further implementation of the fifth aspect, the feedback information is ID information of the to-be-used transmit antenna, and the initiator device further includes an updating module, configured to: after the feedback information sent by the first responder is received, update the status information by using the ID information of the to-be-used transmit antenna.

With reference to the fifth aspect or any possible implementation of the fifth aspect, in a further implementation of the fifth aspect, when the feedback information is updated status information, the updating module directly uses, as the updated status information, the feedback information sent by the first responder, where the updated status information includes information indicating that the to-be-used transmit antenna is selected by the first responder.

With reference to the fifth aspect or any possible implementation of the fifth aspect, in a further implementation of the fifth aspect, the sending module is configured to: when the first responder performs access in a carrier sense multiple access (CSMA) mode, send the status information to the first responder by using a sector sweep (SSW) frame; or, send the status information to the first responder by using a trigger frame. The trigger frame is an indication frame that triggers access of a second responder, and the second responder is any responder of the multiple responders except the first responder. The receiving module is specifically configured to receive, by using the SSW frame, the feedback information sent by the first responder.

According to a sixth aspect, a responder device is provided, where when an initiator device performs beam training on multiple responders, the responder device is any one of the multiple responders that correspond to the initiator device. The responder device includes a receiving module, configured to receive status information sent by the initiator device. The status information indicates whether transmit antennas of the initiator device are selected. The responder device also includes an antenna selection module, configured to select a to-be-used transmit antenna from the transmit antennas according to the status information. The responder device also includes a feedback module, configured to generate feedback information according to information about the to-be-used transmit antenna, and send the feedback information to the initiator device, so that after receiving the feedback information, the initiator device determines, according to the feedback information, the to-be-used transmit antenna selected by the responder device.

With reference to the sixth aspect or any possible implementation of the sixth aspect, in a further implementation of the sixth aspect, the feedback module is further configured to: generate the feedback information according to ID information of the to-be-used transmit antenna, or update the status information using the information about the to-be-used transmit antenna, where updated status information is the feedback information, and the feedback information includes information indicating that the to-be-used transmit antenna is selected by the responder device.

With reference to the sixth aspect or any possible implementation of the sixth aspect, in a further implementation of the sixth aspect, when the responder device includes multiple groups of antennas and the feedback information includes information about a to-be-used antenna that is of the responder device and that corresponds to the to-be-used transmit antenna, the responder device further includes: an antenna pair forming module, configured to form, according to the feedback information, a beamforming antenna pair in which the to-be-used transmit antenna corresponds to the to-be-used antenna of the responder device in a one-to-one manner.

With reference to the sixth aspect or any possible implementation of the sixth aspect, in a further implementation of the sixth aspect, the receiving module is configured to: when the responder device performs access in a carrier sense multiple access (CSMA) mode, receive the status information using a sector sweep (SSW) frame; or, receive the status information using a trigger frame, where the trigger frame is an indication frame that triggers access of a second responder, and the second responder is any responder of the multiple responders except the responder device. The feedback module is configured to send the feedback information to the initiator device by using the SSW frame.

One or two of the foregoing technical solutions have at least the following technical effects.

According to the method and the apparatus provided in embodiments of the present invention, the initiator stores the status information of the transmit antennas. The status information indicates whether each transmit antenna of the initiator is occupied by a responder. Before a responder selects a transmit antenna of the initiator, the initiator sends the status information to the responder. The responder selects the transmit antenna of the initiator only after receiving the status information. This can prevent the responder from selecting a same transmit antenna of the initiator as that selected by another responder, and further avoid a conflict that occurs when multiple responders select the transmit antennas of the initiator to generate a directional beam antenna pair.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
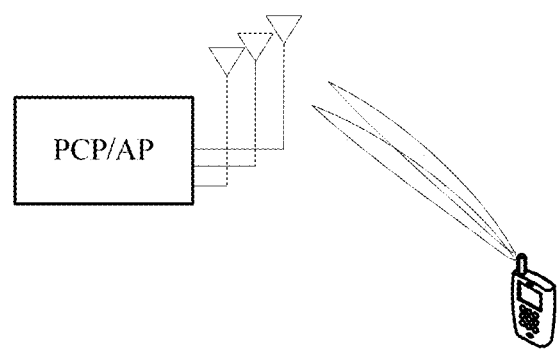
FIG. 1 is a schematic diagram of beamforming at a transmit end in the a current system.
Figure 2A:
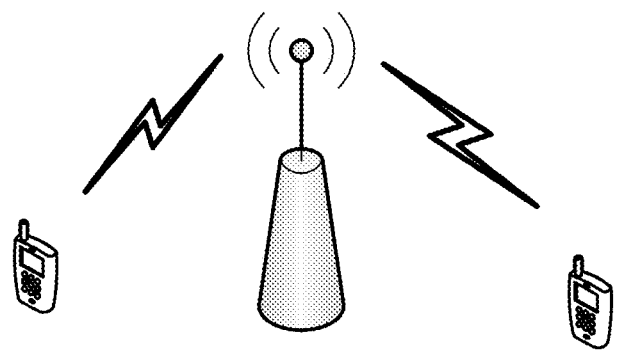
FIG. 2a is a schematic diagram in which a beam of a base station points to a user terminal by means of beam training in the prior art.
Figure 2B:
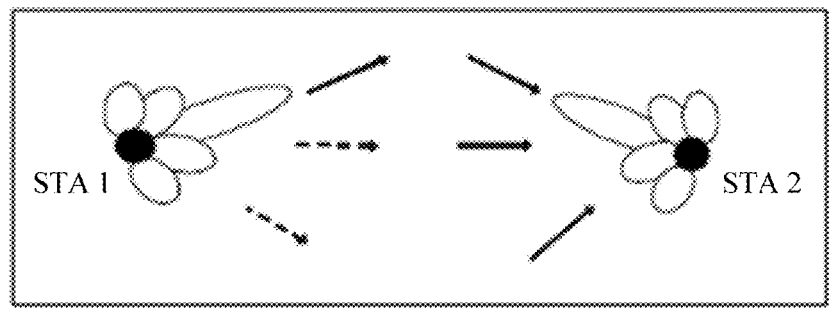
FIG. 2b is a schematic diagram in which beams of two terminals are aligned by means of beam training in a current system.
Figure 3:
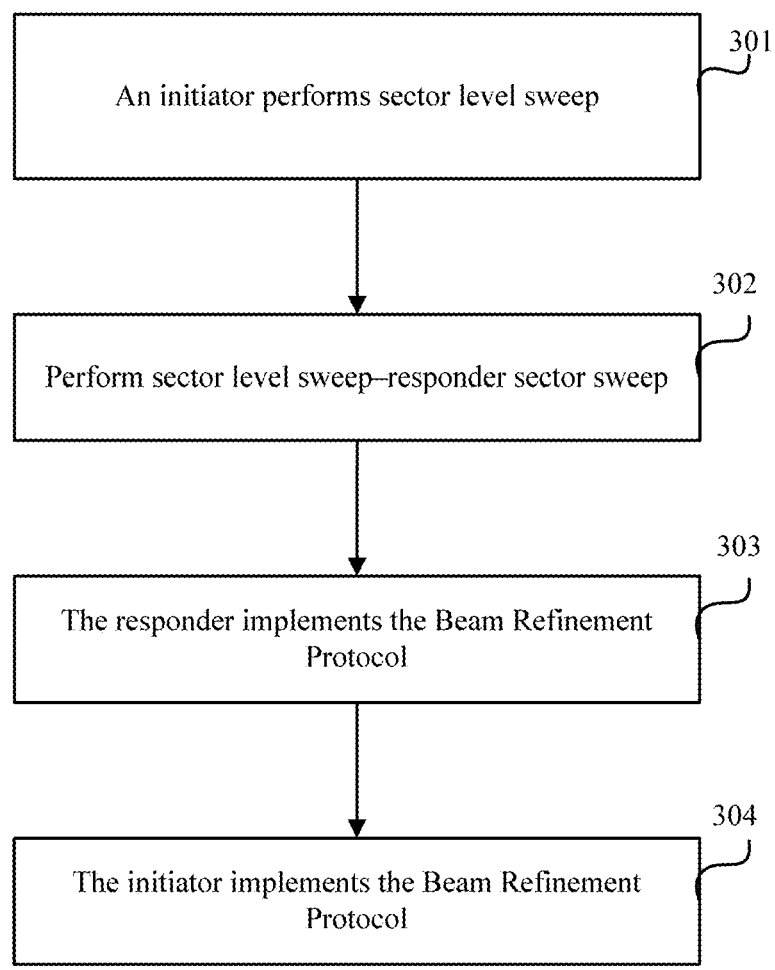
FIG. 3 is a schematic flowchart of an existing beam training implementation method according to the IEEE 802.11ad.
Figure 4:
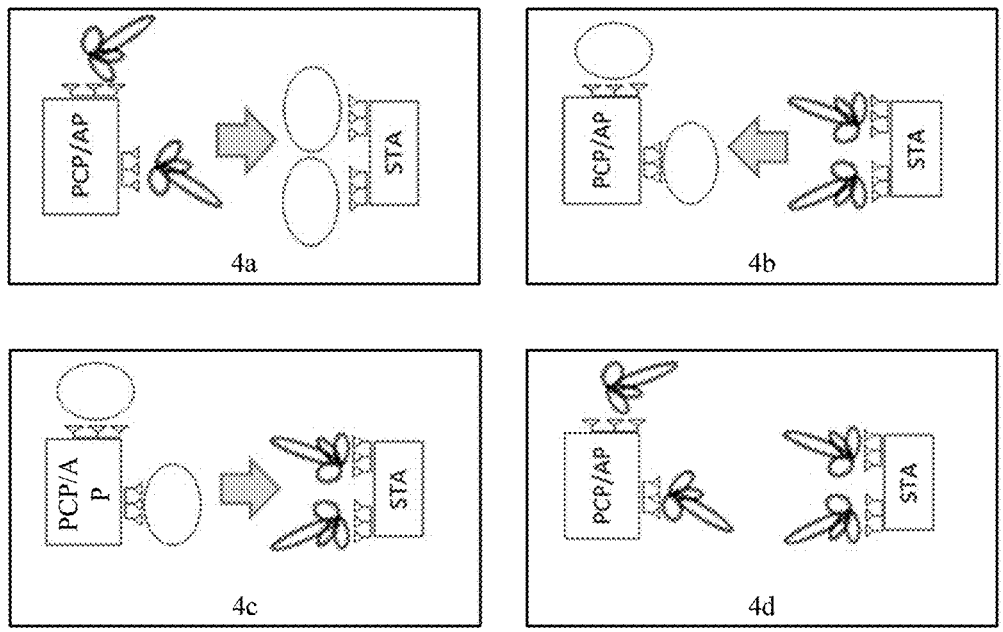
FIG. 4 is schematic diagrams of antennas of an initiator and a responder in an implementation process of the method shown in FIG. 3.

A beam training method defined in the IEEE 802.11ad standard includes the following steps as shown in FIG. 3. FIG. 4 shows antennas of an initiator and a responder in a process of implementing the method shown in FIG. 3.

Step 301. An initiator performs sector level sweep (Sector Level Sweep-Initiator Sector Sweep, SLS-ISS) to train a transmit antenna of the initiator. The initiator may be a point coordination function/access point (PCP/AP). Antennas of the initiator and a responder are shown in FIG. 4). Specific implementation of this step may be as follows.

The initiator (for example, a PCP/AP in FIG. 4a) sequentially sends a beam training frame in a beam direction that can be formed by each transmit antenna of the initiator (that is, a sector), and performs a beam sweep operation.

A receive antenna of the responder (for example, a STA in FIG. 4a) is configured to a quasi-omni pattern (quasi-omni pattern), receives the beam training frame, and measures information such as a signal-to-noise ratio (SNR) corresponding to a transmit beam direction of the PCP/AP.

Step 302. Perform sector level sweep-responder sector sweep (SLS-RSS) to train a transmit antenna of a responder. Antennas of the initiator and the responder are shown in FIG. 4b). Specific implementation of this step may be as follows.

A station (STA) sequentially sends a beam training frame in a beam direction that can be formed by each transmit antenna of the station, and performs a beam sweep operation. The beam training frame includes feedback information of the STA, and the feedback information indicates ID information of beam directions of several candidate transmit antennas that are of the PCP/AP and that are selected by the STA, SNRs corresponding to the candidate transmit antennas, and other information.

A receive antenna of the PCP/AP is configured to the quasi-omni pattern, receives the beam training frame fed back by the responder, and measures information such as an SNR corresponding to a transmit beam direction of the STA.

Step 303. The responder implements the Beam Refinement Protocol (Beam Refinement Protocol-Multiple sector ID capture, BRP-Step for MID) to train a receive antenna of the responder. Antennas of the initiator and the responder are shown in FIG. 4c. Specific implementation of this step may be as follows.

The transmit antenna of the PCP/AP is configured to the quasi-omni pattern, and sends a beam training frame.

The STA sequentially receives the beam training frame in a beam direction that can be formed by each receive antenna of the STA, and measures information such as a signal-to-noise ratio corresponding to a receive beam direction.

The STA feeds back, to the PCP/AP using a next beam training frame, ID information that is used to indicate beam directions of several candidate receive antennas selected by the STA.

Step 304. The initiator implements the Beam Refinement Protocol (Beam Refinement Protocol-Beam combining, BRP-Step for BC) to find optimal beam directions of a transmit end and a receive end. Antennas of the initiator and the responder are shown in FIG. 4d. Specific implementation of this step may be as follows.

The PCP/AP sends, for each candidate receive antenna beam direction fed back by the STA, the beam training frame in a traversal manner in all beam directions that are of the candidate transmit antennas of the PCP/AP and that are determined in step 302.

The STA sequentially configures an antenna to be in each candidate receive antenna beam direction, receives the beam training frame in a traversal manner, and determines a transmit antenna beam direction and a receive antenna beam direction that are finally selected, that is, an optimal beamforming antenna pair. For example, if there are five candidate transmit antenna beam directions and three candidate receive antenna beam directions, 5*3=15 beam "alignment" operation attempts need to be made.

The STA feeds back, to the PCP/AP using a next beam training frame, a transmit antenna ID corresponding to the finally selected transmit antenna beam direction.

Based on the beam training method defined in the IEEE 802.11ad standard, to avoid a conflict that occurs when multiple STAs selects transmit antennas of the initiator, the embodiments of the present invention provide a method for beam training in a multiuser scenario. The following further describes the embodiments of the present invention in detail with reference to the accompanying drawings in this specification.

Figure 5:
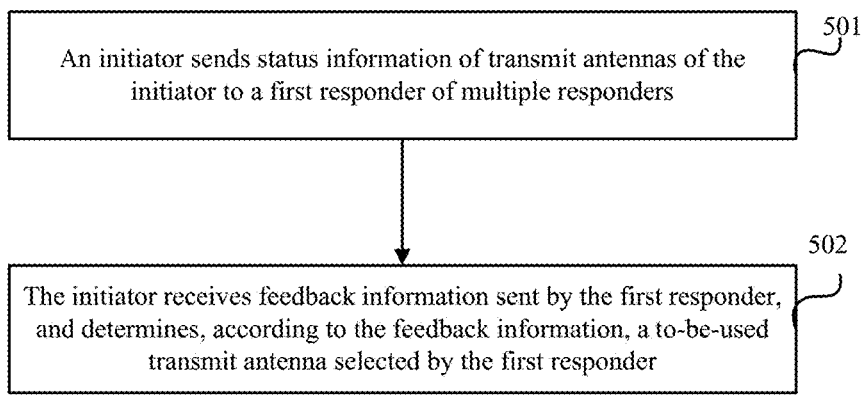
FIG. 5 is a schematic flowchart of a method for beam training in a multiuser scenario according to an embodiment of the present invention.

As shown in FIG. 5, an embodiment of the present invention provides a method for beam training in a multiuser scenario. The method is applied to beam training performed on multiple responders by an initiator, and the method includes the following steps.

Step 501. The initiator sends status information of transmit antennas of the initiator to a first responder of the multiple responders, so that the first responder selects a to-be-used transmit antenna from the transmit antennas according to the status information. The status information indicates whether the transmit antennas of the initiator are selected.

In this embodiment of the present invention, the status information is used for the responder to finally determine the transmit antennas of the initiator. Therefore, the initiator may send the status information to the responder at any moment before the responder finally selects the transmit antennas of the initiator. The status information may be sent at a moment when the initiator sends a beam training frame to the first responder. When the solution provided in this embodiment of the present invention is applied to a WiFi network, the beam training frame may be a sector sweep (SSW) frame or a Beam Refinement Protocol (BRP) frame.

Step 502. The initiator receives feedback information sent by the first responder, and determines, according to the feedback information, the to-be-used transmit antenna selected by the first responder.

In this embodiment, the first responder is any one of the multiple responders that are connected to the initiator. Because each responder selects the transmit antennas of the initiator in a same manner (which is implemented by using step 501 and step 502), a beam training operation performed by the initiator on the multiple responders may be implemented by repeatedly executing step 501 and step 502. After the first responder selects a transmit antenna, a second responder can select, according to the status information, a transmit antenna from the transmit antennas excluding the transmit antenna that has been selected by the first responder.

In a current system, if multiple responders are corresponding to one initiator, information about antennas that are of the initiator and that are selected by the multiple responders is unknown to each other. As a result, if two or more than two responders select a same transmit antenna of the initiator, a conflict occurs. With respect to this problem, in the method according to this embodiment of the present invention, the initiator stores the status information of the transmit antennas of the initiator. The status information indicates whether each transmit antenna of the initiator is occupied by a responder. Before a responder selects a transmit antenna of the initiator, the initiator sends the status information to the responder. The responder selects the transmit antenna of the initiator only after receiving the status information. This can prevent the responder from selecting a same transmit antenna of the initiator as that selected by another responder, and further avoid a conflict that occurs when the multiple responders select the transmit antennas of the initiator to generate a directional beam antenna pair.

In this embodiment, because one initiator is corresponding to the multiple responders, to ensure that a responder is corresponding to an antenna that is of the initiator and that is selected by the responder, the feedback information sent by the responder is specifically classified according to the following cases.

1. If the responder has only one group of antennas, the responder needs to add identification information of the responder (that is, identification information that uniquely identifies the responder) to the feedback information.

2. If the responder includes multiple groups of antennas, the responder needs to add the following information to the feedback information.

A. If the responder selects only one group of antennas, the responder needs to add, to the feedback information, information about a first transmit antenna that is of the initiator and that is selected by the responder, and information about an antenna that is of the responder and that is corresponding to the first transmit antenna.

B. If the responder selects multiple groups of antennas, the responder needs to add, to the feedback information, information about multiple groups of transmit antennas that are of the initiator and that are selected by the responder, information about multiple groups of antennas that are of the responder and that are corresponding to the multiple groups of transmit antennas, and a one-to-one correspondence between the multiple groups of transmit antennas of the initiator and the multiple groups of antennas of the responder.

When the first responder includes multiple groups of antennas and the feedback information includes information about a to-be-used antenna that is of the first responder and that corresponds to the to-be-used transmit antenna, after the initiator receives the feedback information sent by the first responder, the method further includes: forming, by the initiator according to the feedback information, a beamforming antenna pair in which the to-be-used transmit antenna corresponds to the to-be-used antenna of the first responder in a one-to-one manner.

In this embodiment of the present invention, the status information sent by the initiator to the responder is primarily used to distinguish a transmit antenna that has been occupied from a transmit antenna that can be selected by the responder. Therefore, there are a plurality of specific implementations, and the following provides two optimal implementations.

Manner 1.

The status information is first status information indicating whether each of the transmit antennas of the initiator can be selected by the first responder. In this embodiment of the present invention, because an antenna that has been selected by the responder cannot be selected again, identification information of each antenna and information indicating whether the antenna is used may be sent by using the status information.

For example, the initiator may create, according to the transmit antennas of the initiator and a status such as whether each group of transmit antennas is occupied by the responder, a list that describes a use status of a local transmit antenna, as listed in Table 1.

TABLE 1

| | Antenna index of the initiator | | | |
|---|---|---|---|---|
| | Antenna 1 | Antenna 2 | ... | Antenna N |
| Use status (0-unused, 1-used) | 0 | 1 | 0/1 | 0 |

It can be learned from content listed in Table 1 that the initiator has a total of N transmit antennas. The antenna 1 is unused, the antenna 2 is used, . . . , and the antenna N is unused.

Manner 2.

The status information is second status information of a transmit antenna that is in the transmit antennas of the initiator and that can be selected by the first responder.

Because an antenna that has been selected by another responder cannot be used again, the initiator can directly send information about an unused transmit antenna. If some antennas need to be particularly reserved, information about the particularly reserved antennas may be selectively sent to a particular responder using antenna information. Therefore, in this embodiment, the initiator needs to send, to a destination responder, only a transmit antenna subset that can be selected by the destination responder. For example, a transmit antenna set of the initiator is {1, 2, 4, 5, 6, 7, 8}. When the destination responder performs access, an actually available transmit antenna set of the initiator is {4, 5, 6, 7}. During specific implementation, when sending the status information, the initiator can directly send, to the destination responder, the antenna set {4, 5, 6, 7} that can be used by the destination responder. In addition, if the antenna 4 and the antenna 7 in the antennas of the initiator are special antennas and cannot be used by the destination responder, the initiator sends an available antenna set {5, 6} to the destination responder using the status information.

In addition, after the initiator sends the status information according to the manner 1 and the manner 2, specific implementations of feeding back information by a corresponding responder to the initiator may be as follows.

Manner a.

Because the initiator stores information about all transmit antennas of the initiator, the responder may feedback, to the initiator, only information about a transmit antenna that is selected by the responder, and then, the initiator updates a use status of the transmit antenna according to the feedback information. Specific implementation may be as follows.

The feedback information is ID information of the to-be-used transmit antenna. After receiving the feedback information sent by the first responder, the initiator updates the status information of the transmit antennas by using the ID information of the to-be-used transmit antenna.

For example, after the initiator sends antenna status information (for example, the sent information is the information listed in Table 1) to the responder in the manner 1 or the manner 2, the responder selects, according to the received status of the transmit antennas of the initiator, a transmit antenna that is of the initiator and that the responder needs to use (that is, the to-be-used transmit antenna). If the responder selects the antenna 1 and the antenna N, the responder may then send ID information of the selected to-be-used transmit antennas to the initiator (that is, ID information of the antenna 1 and the antenna N). After receiving the ID information, the initiator may update the status information stored by the initiator. An updated result is listed in Table 2.

TABLE 2

| | Antenna index of the initiator | | | |
|---|---|---|---|---|
| | Antenna 1 | Antenna 2 | ... | Antenna N |
| Use status (0-unused, 1-used) | 1 | 1 | 0/1 | 1 |

Manner b.

The feedback information is updated status information, and the updated status information includes information that indicates that the to-be-used transmit antenna is selected by the first responder.

In this embodiment, if the initiator sends the list listed in Table 1, after selecting the to-be-used transmit antenna, the responder updates the list according to selection information. For example, if the responder selects the antenna 1 and the antenna N, the responder updates Table 1 to form content listed in Table 2, and then sends Table 2 as the feedback information to the initiator.

In addition, if the initiator sends information about an available antenna, the responder may identify, based on the status information sent by the initiator, a transmit antenna that is of the initiator and that is selected by the responder, and then send updated status information as the feedback information to the initiator.

During this implementation, the manner 1 and the manner 2 are different implementations of the status information, and the manner a and the manner b are different implementations of the feedback information. In specific actual application, manners of the status information and the feedback information may be randomly combined. For example, the manner 1 and the manner a are combined, or the manner 2 and the manner a are combined.

In a specific WiFi application environment, the solution provided in this embodiment of the present invention may be executed in an SLS phase of beam training. Status information sending and feedback information receiving may be implemented in the following specific manners.

A. Specific implementation of sending the status information of the transmit antennas to the first responder may be as follows. When the first responder performs access in a carrier sense multiple access (CSMA) mode, sending the status information of the transmit antennas to the first responder includes sending, by the initiator, the status information to the first responder by using a sector sweep (SSW) frame; or, sending the status information to the first responder by using a trigger frame. The trigger frame is an indication frame that triggers access of a second responder, and the second responder is any responder of the multiple responders except the first responder.

B. The receiving, by the initiator, the feedback information sent by the first responder includes receiving, by the initiator using the SSW frame, the feedback information sent by the first responder.

Figure 6:
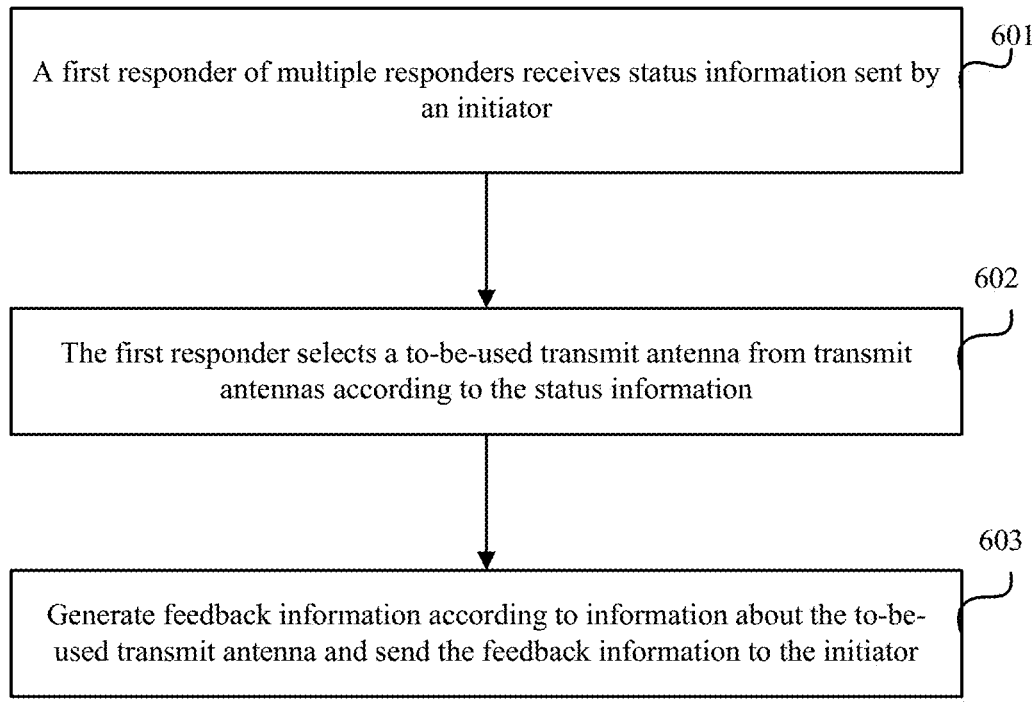
FIG. 6 is a schematic flowchart of another method for beam training in a multiuser scenario according to an embodiment of the present invention.

As shown in FIG. 6, an embodiment of the present invention further provides another method for beam training in a multiuser scenario. The method is applied to beam training performed on multiple responders by an initiator, and the method includes the following steps.

Step 601. A first responder of the multiple responders receives status information sent by the initiator, where the status information is used to indicate whether transmit antennas of the initiator are selected.

The status information includes: first status information indicating whether each of the transmit antennas of the initiator can be selected by the first responder; or second status information of a transmit antenna that is in the transmit antennas of the initiator and that can be selected by the first responder.

Step 602. The first responder selects a to-be-used transmit antenna from the transmit antennas according to the status information.

Step 603. Generate feedback information according to information about the to-be-used transmit antenna, and send the feedback information to the initiator, so that after receiving the feedback information, the initiator determines, according to the feedback information, the to-be-used transmit antenna selected by the first responder.

The generating feedback information according to information about the to-be-used transmit antenna includes:

A. generating the feedback information according to ID information of the to-be-used transmit antenna; or B. updating the status information by using the information about the to-be-used transmit antenna, where updated status information is the feedback information, and the feedback information includes information indicating that the to-be-used transmit antenna is selected by the first responder.

In this embodiment, because one initiator is corresponding to the multiple responders, to ensure that a responder is corresponding to an antenna that is of the initiator and that is selected by the responder, the feedback information sent by the responder is specifically classified according to the following cases.

1. If the responder has only one group of antennas, the responder needs to add identification information of the responder (that is, identification information that uniquely identifies the responder) to the feedback information.

2. If the responder includes multiple groups of antennas, the responder needs to add the following information to the feedback information.

A. If the responder selects only one group of antennas, the responder needs to add, to the feedback information, information about a first transmit antenna that is of the initiator and that is selected by the responder, and information about an antenna that is of the responder and that is corresponding to the first transmit antenna.

B. When the first responder includes multiple groups of antennas and the feedback information includes information about a to-be-used antenna that is of the first responder and that is corresponding to the to-be-used transmit antenna, after the sending the feedback information to the initiator, the method further includes: forming, according to the feedback information, a beamforming antenna pair in which the to-be-used transmit antenna is corresponding to the to-be-used antenna of the first responder in a one-to-one manner.

In a specific WiFi application environment, the solution provided in this embodiment of the present invention may be executed in an SLS phase of beam training. Status information receiving and feedback information sending may be implemented in the following specific manners.

A. Obtaining status information of transmit antennas of the initiator includes: when the first responder performs access in a carrier sense multiple access (CSMA) mode, receiving, by the first responder, the status information from the initiator using a sector sweep (SSW) frame; or, receiving the status information using a trigger frame. The trigger frame is an indication frame that triggers access of a second responder, and the second responder is any responder of the multiple responders except the first responder.

B. The sending the feedback information to the initiator includes: sending, by the first responder, the feedback information to the initiator by using the SSW frame.

Figure 7:
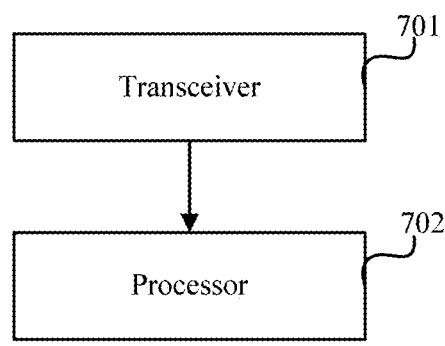
FIG. 7 is a schematic structural diagram of an initiator device according to an embodiment of the present invention.

As shown in FIG. 7, an embodiment of the present invention further provides an initiator device. The initiator device performs beam training on multiple responders, and the initiator device includes: a transceiver 701, configured to send status information of transmit antennas of the initiator device 701 to a first responder of the multiple responders, and receive feedback information sent by the first responder, so that the first responder selects a to-be-used transmit antenna from the transmit antennas according to the status information. The status information indicates whether the transmit antennas of the initiator device are selected. The transceiver is configured to send, to the first responder of the multiple responders, first status information indicating whether each of the transmit antennas of the initiator device can be selected by the first responder, or second status information of a transmit antenna that is in the transmit antennas of the initiator device and that can be selected by the first responder. The first status information or the second status information is used as the status information. The initiator device also includes a processor 702, configured to determine, according to the feedback information, the to-be-used transmit antenna selected by the first responder.

In this embodiment, a final objective of performing beam training by the initiator device on the responders is to form a beamforming antenna pair. Because the antenna pair is in a one-to-one correspondence, when the first responder includes multiple groups of antennas and the feedback information includes information about a to-be-used antenna that is of the first responder and that corresponds to the to-be-used transmit antenna, after the feedback information sent by the first responder is received, the processor 702 is further configured to form, according to the feedback information, a beamforming antenna pair in which the to-be-used transmit antenna corresponds to the to-be-used antenna of the first responder in a one-to-one manner.

Further, to avoid that an antenna selected by a current responder is selected by another responder, after receiving the feedback information, the initiator device needs to determine, according to a specific form of the feedback information, whether to update the status information of the transmit antennas of the initiator device. Specific implementation includes one of the following.

1. When the feedback information is ID information of the to-be-used transmit antenna, after the feedback information sent by the first responder is received, the processor 702 is further configured to update the status information using the ID information of the to-be-used transmit antenna.

2. The feedback information received by the transceiver 701 is updated status information, and the updated status information includes information indicating that the to-be-used transmit antenna is selected by the first responder. In this case, if the initiator device further needs to perform beam training on the another responder (for example, a second responder), and the status information initially sent by the initiator device to the first responder includes status information of all unoccupied transmit antennas, after receiving the feedback information in this form (that is, the updated status information), the initiator device may directly send the feedback information as the status information to the second responder, to instruct the second responder to select a transmit antenna of the initiator device.

In a specific WiFi application environment, the solution provided in this embodiment of the present invention may be executed in an SLS phase of beam training. The transceiver 701 may send the status information and receive the feedback information in the following specific manners.

The transceiver 701 is specifically configured to: when the first responder performs access in a carrier sense multiple access (CSMA) mode, send the status information to the first responder by using a sector sweep (SSW) frame; or, send the status information to the first responder by using a trigger (trigger) frame, where the trigger frame is an indication frame that triggers access of a second responder, and the second responder is any responder of the multiple responders except the first responder.

The transceiver 701 is specifically configured to receive, by using the SSW frame, the feedback information sent by the first responder.

Figure 8:
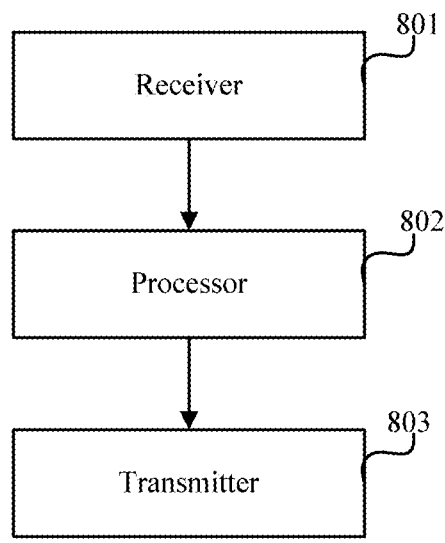
FIG. 8 is a schematic structural diagram of a responder device according to an embodiment of the present invention.

As shown in FIG. 8, an embodiment of the present invention further provides a responder device. When an initiator device performs beam training on multiple responders, the responder device is any one of the multiple responders that are corresponding to the initiator device. The responder device includes: a receiver 801, configured to receive status information sent by the initiator device, where the status information indicates whether transmit antennas of the initiator device are selected, where the status information received by the receiver 801 is first status information indicating whether each of the transmit antennas of the initiator device can be selected by the responder device, or second status information of a transmit antenna that is in the transmit antennas of the initiator device and that can be selected by the responder device. The responder device also includes a processor 802, configured to: select a to-be-used transmit antenna from the transmit antennas according to the status information, and generate feedback information according to information about the to-be-used transmit antenna selected by the processor 802. The responder device also includes a transmitter 803, configured to send the feedback information to the initiator device, so that after receiving the feedback information, the initiator device determines, according to the feedback information, the to-be-used transmit antenna selected by the responder device.

In this embodiment, a final objective of performing beam training by the initiator device on the responders is to form a beamforming antenna pair. Because the antenna pair is in a one-to-one correspondence, when the responder device includes multiple groups of antennas and the feedback information includes information about a to-be-used antenna that is of the first responder and that corresponds to the to-be-used transmit antenna, the processor 802 is further configured to form, according to the feedback information, a beamforming antenna pair in which the to-be-used transmit antenna is corresponding to the to-be-used antenna of the first responder in a one-to-one manner.

In this embodiment, the receiver 810 and the transmitter 803 are two separate modules. However, in specific application, the receiver 810 and the transmitter 803 may be integrated into one module. The solution provided in this embodiment is merely intended to describe that the responder device has a function of receiving and transmitting information, and whether the receiver and the transmitter in this embodiment of the present invention are two separate modules is not limited.

In this embodiment, there are many methods for forming the feedback information, and the following provides several optimal implementations.

1. The processor 802 is specifically configured to generate the feedback information according to ID information of the to-be-used transmit antenna.

2. The processor 802 is specifically configured to update the status information using the information about the to-be-used transmit antenna, where updated status information is the feedback information, and the feedback information includes information indicating that the to-be-used transmit antenna is selected by the responder device.

In a specific WiFi application environment, the solution provided in this embodiment of the present invention may be executed in an SLS phase of beam training. Status information sending and feedback information receiving may be implemented in the following specific manners.

The receiver 801 is specifically configured to: when the responder device performs access in a carrier sense multiple access (CSMA) mode, receive the status information from the initiator using a sector sweep (SSW) frame; or, receive the status information using a trigger frame, where the trigger frame is an indication frame that triggers access of a second responder, and the second responder is any responder of the multiple responders except the current responder device.

The transmitter 803 is configured to send the feedback information to the initiator device by using the SSW frame.

Figure 9:
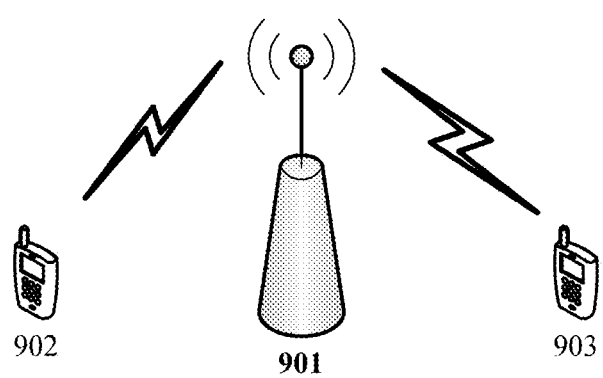
FIG. 9 is a schematic structural diagram of a system for beam training in a multiuser scenario according to an embodiment of the present invention.

As shown in FIG. 9, an embodiment of the present invention provides a system for beam training in a multiuser scenario. The system includes an initiator and multiple responders (which may include a first responder and a second responder) that correspond to the initiator. When the initiator performs beam training on the multiple responders, if the initiator first performs beam training on the first responder, the system includes: an initiator 901, configured to: send status information of transmit antennas of the initiator 901 to a first responder of the multiple responders, receive feedback information sent by the first responder, and determine, according to the feedback information, a to-be-used transmit antenna selected by the first responder, where the status information is used to indicate whether the transmit antennas of the initiator 901 are selected. The system also includes the first responder 902, configured to select the to-be-used transmit antenna from the transmit antennas according to the status information.

When performing beam training on a second responder 903, the initiator 901 is further configured to: update the status information of the transmit antennas using the feedback information sent by the first responder 902, and send updated status information to the second responder, so that the second responder selects an available transmit antenna of the initiator 901 according to the updated status information.

A directional beam antenna usually includes multiple antenna array elements. To avoid confusion, the antenna disclosed in Embodiment 1 to Embodiment 6 of the present invention is described herein. A single transmit antenna in any embodiment of the present invention may be defined as follows: A group of antenna array elements that generate a beam direction in a single time segment is referred to as a single antenna.

Figure 10:
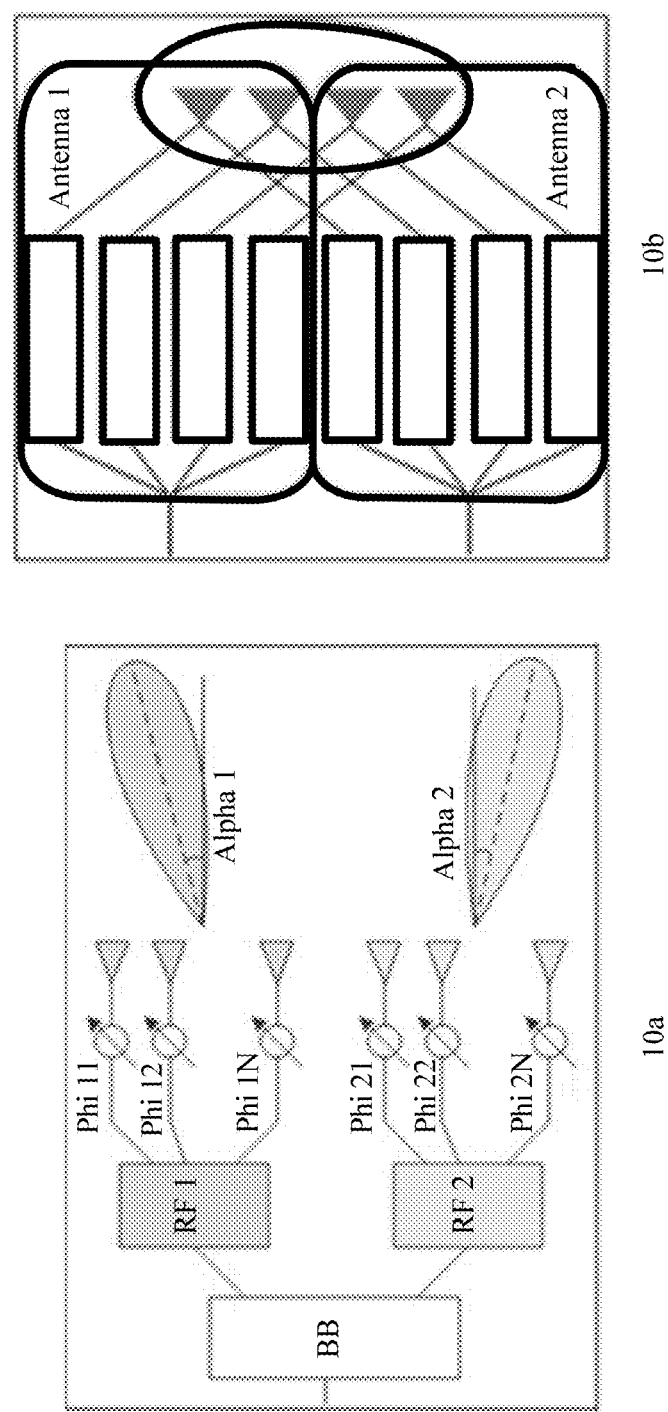
FIG. 10 is a schematic structural diagram of an antenna according to an embodiment of the present invention.

Therefore, according to two MIMO system architectures that may appear in the industry, in an architecture (subarray) in FIG. 10*a* of FIG. 10, a single antenna is a group of antenna array elements that generate a directional angle of alpha1 or alpha2. That is, in FIG. 10*a*, an antenna whose directional angle is alpha1 forms an antenna defined in this embodiment, and an antenna whose directional angle is alpha2 forms another antenna defined in this embodiment. Therefore, two antennas defined in this embodiment of the present invention are included in this structure.

In an architecture (full connected) in FIG. 10*b* of FIG. 10, a single antenna is a group of antenna array elements including a drive circuit that is connected to the group of antenna array elements. Even though an antenna 1 and an antenna 2 share one group of antenna array elements, they use two separate groups of drive circuits. Therefore, in this embodiment of the present invention, there are two antennas in this structure.

Figure 11:
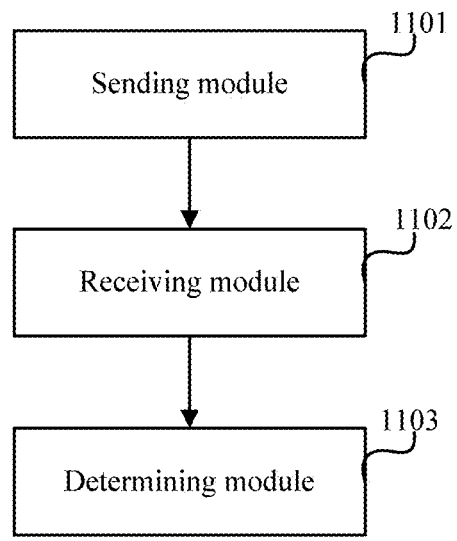
FIG. 11 is a schematic structural diagram of another initiator device according to an embodiment of the present invention.

As shown in FIG. 11, an embodiment of the present invention further provides an initiator device. The initiator device performs beam training on multiple responders, and the initiator device includes: a sending module 1101, configured to send status information of transmit antennas of the initiator device to a first responder of the multiple responders, so that the first responder selects a to-be-used transmit antenna from the transmit antennas according to the status information, where the status information indicates whether the transmit antennas of the initiator device are selected. The initiator device also includes a receiving module 1102, configured to receive feedback information sent by the first responder. The initiator device also includes a determining module 1103, configured to determine, according to the feedback information, the to-be-used transmit antenna selected by the first responder.

In this embodiment, a final objective of performing beam training by the initiator device on the responders is to form a beamforming antenna pair. Because the antenna pair is in a one-to-one correspondence, when the first responder includes multiple groups of antennas and the feedback information includes information about a to-be-used antenna that is of the first responder and that corresponds to the to-be-used transmit antenna, the initiator device further includes: an antenna pair forming module, configured to form, according to the feedback information, a beamforming antenna pair in which the to-be-used transmit antenna corresponds to the to-be-used antenna of the first responder in a one-to-one manner.

To generate the status information indicating statuses of the transmit antennas, the initiator device further includes a status information generation module. The status information generation module is configured to: generate the status information by using a status indicating whether each of the transmit antennas of the initiator device can be selected by the first responder; or generate the status information by using a status of a transmit antenna that is in the transmit antennas of the initiator and that can be selected by the first responder.

After the multiple responders select the transmit antennas of the initiator device, use statuses of the transmit antennas of the initiator device change in real time. Therefore, to ensure that the multiple responders do not repeatedly select a same transmit antenna of the initiator device, the status information of the transmit antennas of the initiator device needs to be updated in real time. In this embodiment, the feedback information is ID information of the to-be-used transmit antenna, and the initiator device further includes: an updating module, configured to: after the feedback information sent by the first responder is received, update the status information using the ID information of the to-be-used transmit antenna.

In addition, because the operation of updating the status information may be implemented by the first responder, when the feedback information is updated status information, the updating module directly uses, as the updated status information, the feedback information sent by the first responder. The updated status information includes information used to indicate that the to-be-used transmit antenna is selected by the first responder.

In a specific WiFi application environment, the solution provided in this embodiment of the present invention may be executed in an SLS phase of beam training. Specific implementation of sending the status information by the sending module 1101 and receiving the feedback information by the receiving module 1102 may be as follows.

The sending module 1101 is configured to: when the first responder performs access in a carrier sense multiple access (CSMA) mode, send the status information to the first responder using a sector sweep (SSW) frame; or, send the status information to the first responder using a trigger frame. The trigger frame is an indication frame that triggers access of a second responder, and the second responder is any responder of the multiple responders except the first responder.

The receiving module 1102 is configured to receive, using the SSW frame, the feedback information sent by the first responder.

Figure 12:
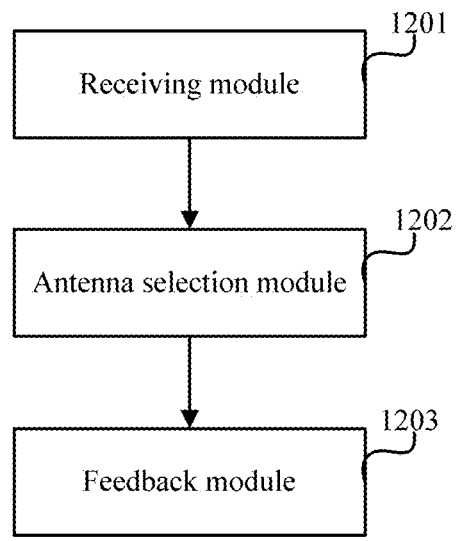
FIG. 12 is a schematic structural diagram of another responder device according to an embodiment of the present invention.

As shown in FIG. 12, an embodiment of the present invention further provides a responder device. When an initiator device performs beam training on multiple responders, the responder device is any one of the multiple responders that correspond to the initiator device. The responder device includes: a receiving module 1201, configured to receive status information sent by the initiator device, where the status information indicates whether transmit antennas of the initiator device are selected, where the status information may be first status information indicating whether each of the transmit antennas of the initiator device can be selected by the responder device, or second status information of a transmit antenna that is in the transmit antennas of the initiator device and that can be selected by the responder device. The responder device also includes an antenna selection module 1202, configured to select a to-be-used transmit antenna from the transmit antennas according to the status information. The responder device also includes a feedback module 1203, configured to: generate feedback information according to information about the to-be-used transmit antenna, and send the feedback information to the initiator device, so that after receiving the feedback information, the initiator device determines, according to the feedback information, the to-be-used transmit antenna selected by the responder device.

The feedback module 1203 is further configured to: generate the feedback information according to ID information of the to-be-used transmit antenna, or update the status information using the information about the to-be-used transmit antenna, where updated status information is the feedback information, and the feedback information includes information used to indicate that the to-be-used transmit antenna is selected by the responder device.

In this embodiment, a final objective of performing beam training by the initiator device on the responders is to form a beamforming antenna pair. Because the antenna pair is in a one-to-one correspondence, when the responder device includes multiple groups of antennas and the feedback information includes information about a to-be-used antenna that is of the responder device and that corresponds to the to-be-used transmit antenna, the responder device further includes: an antenna pair forming module, configured to form, according to the feedback information, a beamforming antenna pair in which the to-be-used transmit antenna corresponds to the to-be-used antenna of the responder device in a one-to-one manner.

In a specific WiFi application environment, the solution provided in this embodiment of the present invention may be executed in an SLS phase of beam training. In this embodiment, receiving the status information by the receiving module 1201 and sending the feedback information by the feedback module 1203 may be implemented in the following specific manners.

The receiving module 1201 is configured to: when the first responder performs access in a carrier sense multiple access CSMA mode, receive the status information using a sector sweep (SSW) frame; or, receive the status information using a trigger frame, where the trigger frame is an indication frame that triggers access of a second responder, and the second responder is any responder of the multiple responders except the responder device.

The feedback module 1203 is configured to send the feedback information to the initiator device using the SSW frame.

The foregoing one or more technical solutions in the embodiments of this application have at least the following technical effects.

In a current system, if multiple responders are corresponding to one initiator, information about antennas that are of the initiator and that are selected by the multiple responders is unknown to each other. As a result, if two or more than two responders select a same transmit antenna of the initiator, a conflict occurs. According to the method in the embodiments, the initiator stores the status information of the transmit antennas, where the status information indicates whether each transmit antenna of the initiator is occupied by a responder. Before a responder selects a transmit antenna of the initiator, the initiator sends the status information to the responder. The responder selects the transmit antenna of the initiator only after receiving the status information. This can prevent the responder from selecting a same transmit antenna of the initiator as that selected by another responder, and further avoid a conflict that occurs when the multiple responders select the transmit antennas of the initiator to generate a directional beam antenna pair.

The methods described in embodiments of the present invention are not limited to the embodiments described in the Description of Embodiments. Another implementation obtained by a person skilled in the art according to the technical solutions of the present invention still belongs to a technical innovation scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
    sending, by an initiator, first status information of a plurality of transmit antennas of the initiator to only a first responder of a plurality of responders, wherein the first status information indicates which of the plurality of transmit antennas of the initiator are available to be selected by the first responder; and
    receiving, by the initiator, feedback information sent by the first responder, wherein the feedback information comprises information indicating a to-be-used transmit antenna which is selected by the first responder from the available to be selected transmit antennas indicated by the first status information; and
    determining, according to the feedback information, the to-be-used transmit antenna selected by the first responder;
    updating the first status information to form second status information according to the feedback information, and after forming the second status information, sending the second status information to only a second responder, wherein the second responder is comprised in the plurality of responders and is different than the first responder, wherein the second status information indicates which of the plurality of the transmit antennas of the initiator are available to be selected by the second responder, and the transmit antennas available to be selected by the second responder that are indicated by the second status information do not include the to-be-used transmit antenna selected by the first responder.

2. The method according to claim 1, wherein the first status information comprises:
    information indicating whether each of the plurality of transmit antennas of the initiator is available to be selected by the first responder; or
    information indicating at least one first transmit antenna of the plurality of transmit antennas of the initiator that is available to be selected by the first responder.

3. The method according to claim 1, wherein the feedback information is ID information of the to-be-used transmit antenna, and updating the first status information to form the second status information comprises:
    updating, by the initiator, the first status information using the ID information of the to-be-used transmit antenna to form the second status information.

4. The method according to claim 1, wherein the feedback information comprises identification information of each transmit antenna of the plurality of transmit antennas of the initiator and information indicating whether each transmit antenna of the plurality of antennas is selected, and wherein selected transmit antennas indicated by the feedback information comprises the to-be-used transmit antenna selected by the first responder; and
    wherein updating the first status information to form the second status information comprises:
    using the feedback information as the second status information.

5. The method according to claim 1, wherein sending, by the initiator, the first status information of the plurality of transmit antennas of the initiator to only the first responder of the plurality of responders comprises:
    when the first responder performs access in a carrier sense multiple access (CSMA) mode, sending, by the initiator, the first status information to only the first responder using a sector sweep (SSW) frame; or
    sending the first status information to only the first responder using a trigger frame, wherein the trigger frame is an indication frame that triggers access of the second responder.

6. The method according to claim 1, wherein receiving, by the initiator, the feedback information sent by the first responder comprises:
    receiving, by the initiator using a sector sweep (SSW) frame, the feedback information sent by the first responder.

7. The method according to claim 1, wherein the first responder comprises a plurality of groups of antennas, the feedback information comprises information about a to-be-used antenna of the first responder that corresponds to the to-be-used transmit antenna, and after receiving, by the initiator, the feedback information sent by the first responder, the method further comprises:
    forming, by the initiator according to the received feedback information, a beamforming antenna pair in which the to-be-used transmit antenna of the initiator corresponds to the to-be-used antenna of the first responder in a one-to-one manner.

8. A method, comprising:
    receiving, by a first responder of a plurality of responders, first status information sent by an initiator, wherein the first status information indicates which of a plurality of transmit antennas of the initiator are available to be selected by the first responder;
    selecting, by the first responder, a to-be-used transmit antenna from available to be selected transmit antennas indicated by the first status information; and
    generating, by the first responder, feedback information according to information about the to-be-used transmit antenna, and sending the feedback information to the initiator, wherein the feedback information is used by the initiator to update the first status information to form second status information, and after the second status information is formed, the second status information is sent by the initiator to only a second responder, wherein the second responder is comprised in the plurality of responders and is different than the first responder, wherein the second status information indicates which of the plurality of the transmit antennas of the initiator are available to be selected by the second responder, and wherein the transmit antennas available to be selected by the second responder that are indicated by the second status information do not include the to-be-used transmit antenna selected by the first responder.

9. The method according to claim 8, wherein the first status information comprises:
information indicating whether each of the plurality of transmit antennas of the initiator is available to be selected by the first responder; or
information of at least one first transmit antenna of the plurality of transmit antennas of the initiator that is available to be selected by the first responder.

10. The method according to claim 8, wherein generating the feedback information according to the information about the to-be-used transmit antenna comprises:
generating the feedback information according to ID information of the to-be-used transmit antenna.

11. The method according to claim 8, wherein generating the feedback information according to the information about the to-be-used transmit antenna comprises:
updating the first status information using the information about the to-be-used transmit antenna to form updated first status information, and using the updated first status information as the feedback information, wherein the feedback information comprises identification information of each transmit antenna of the plurality of transmit antennas of the initiator and information indicating whether each transmit antenna is selected, and the selected transmit antennas indicated by the feedback information comprises the to-be-used transmit antenna selected by the first responder.

12. The method according to claim 8, wherein receiving, by the first responder of the plurality of responders, the first status information sent by the initiator comprises:
when the first responder performs access in a carrier sense multiple access (CSMA) mode, receiving, by the first responder, the first status information from the initiator using a sector sweep (SSW) frame; or
receiving the first status information using a trigger frame, wherein the trigger frame is an indication frame that triggers access of the second responder.

13. The method according to claim 8, wherein sending the feedback information to the initiator comprises:
sending, by the first responder, the feedback information to the initiator using a sector sweep (SSW) frame.

14. The method according to claim 8, wherein the first responder comprises a plurality of groups of antennas, the feedback information comprises information about a to-be-used antenna that is of the first responder and that corresponds to the to-be-used transmit antenna, and after sending the feedback information to the initiator, the method further comprises:
forming, according to the feedback information, a beamforming antenna pair in which the to-be-used transmit antenna of the initiator corresponds to the to-be-used antenna of the first responder in a one-to-one manner.

15. An initiator device, comprising:
a transceiver, configured to:
send first status information of a plurality of transmit antennas of the initiator device to only a first responder of a plurality of responders; and
receive feedback information sent by the first responder, wherein the feedback information comprises information indicating a to-be-used transmit antenna which is selected by the first responder from available to be selected transmit antennas indicated by the first status information, wherein the first status information indicates which of the plurality of transmit antennas of the initiator device are available to be selected by the first responder; and
a processor, configured to:
determine, according to the feedback information, the to-be-used transmit antenna selected by the first responder; and
update the first status information according to the feedback information to form second status information, and after forming the second status information, send the second status information to only a second responder, wherein the second responder is comprised in the plurality of responders and is different than the first responder, wherein the second status information indicates which of the plurality of the transmit antennas of the initiator device are available to be selected by the second responder, and the transmit antennas available to be selected by the second responder that are indicated by the second status information do not include the to-be-used transmit antennas selected by the first responder.

16. The initiator device according to claim 15, wherein the first status information comprises:
information indicating whether each of the plurality of transmit antennas of the initiator device is available to be selected by the first responder; or
information of at least one first transmit antenna of the plurality of transmit antennas of the initiator device that is available to be selected by the first responder.

17. The initiator device according to claim 15, wherein the feedback information comprises ID information of the to-be-used transmit antenna, and the processor is configured to update the first status information using the ID information of the to-be-used transmit antenna to form the second status information.

18. The initiator device according to claim 15, wherein the feedback information comprises identification information of each transmit antenna of the plurality of transmit antennas of the initiator device and information indicating whether each transmit antenna is selected, and selected transmit antennas indicated by the feedback information comprise the to-be-used transmit antenna selected by the first responder; and
wherein the processor is configured to use the feedback information as the second status information.

19. The initiator device according to claim 15, wherein the transceiver is configured to:
when the first responder performs access in a carrier sense multiple access (CSMA) mode, send the first status information to the first responder using a sector sweep (SSW) frame; or
send the first status information to the first responder using a trigger frame, wherein the trigger frame is an indication frame that triggers access of the second responder.

20. The initiator device according to claim 15, wherein the first responder comprises a plurality of groups of antennas, the feedback information comprises information about a to-be-used antenna that is of the first responder and that corresponds to the to-be-used transmit antenna, and after the feedback information sent by the first responder is received, the processor is further configured to:
form, according to the feedback information, a beamforming antenna pair in which the to-be-used transmit antenna of the initiator device corresponds to the to-be-used antenna of the first responder in a one-to-one manner.

\* \* \* \* \*